United States Patent
Brosowsky

(10) Patent No.: US 11,481,614 B2
(45) Date of Patent: Oct. 25, 2022

(54) METHOD AND SYSTEM FOR GENERATING SAFETY-CRITICAL OUTPUT VALUES OF AN ENTITY

(71) Applicant: Dr. Ing. h.c. F. Porsche Aktiengesellschaft, Stuttgart (DE)

(72) Inventor: Mathis Brosowsky, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 303 days.

(21) Appl. No.: 16/908,824

(22) Filed: Jun. 23, 2020

(65) Prior Publication Data

US 2021/0027150 A1 Jan. 28, 2021

(30) Foreign Application Priority Data

Jul. 22, 2019 (DE) ...................... 10 2019 119 739.2

(51) Int. Cl.
  *G06N 3/04* (2006.01)
  *G06N 3/063* (2006.01)
  *G06K 9/62* (2022.01)

(52) U.S. Cl.
  CPC ........... *G06N 3/063* (2013.01); *G06K 9/6256* (2013.01); *G06N 3/04* (2013.01)

(58) Field of Classification Search
  CPC .......... G06N 3/04; G06N 3/063; G06N 3/082; G06K 9/6215; G06K 9/6217; G06K 9/6256; G06K 9/627; G06V 10/764; G06V 10/82; G06V 40/161
  See application file for complete search history.

(56) References Cited

U.S. PATENT DOCUMENTS

| | | | |
|---|---|---|---|
| 2018/0300629 A1 | 10/2018 | Kharaghani et al. | |
| 2020/0285243 A1* | 9/2020 | Morita et al. | ........ G05D 1/0285 |
| 2020/0380368 A1* | 12/2020 | Benson | ................... G06F 17/16 |

FOREIGN PATENT DOCUMENTS

| | | |
|---|---|---|
| DE | 10113538 A1 | 9/2002 |
| DE | 102019105848 A1 | 4/2019 |
| DE | 102019105850 A1 | 4/2019 |
| EP | 1449743 A2 | 8/2004 |

* cited by examiner

Primary Examiner — Andrew W Johns
(74) *Attorney, Agent, or Firm* — RatnerPrestia

(57) ABSTRACT

A method for generating one or more safety-critical output values (y) of an entity, including determining at least one parameter (s) of the entity, whereby the parameter describes at least one state and/or at least one feature of the entity. At least one delimited value range (C(s)) for the parameter (s) is set. At least one measured value (x) for the determined parameter (s) by at least one sensor is ascertained. The measured value (x) from the sensor to at least one processor and/or at least one data storage unit is transmitted. At least one output value (y) is calculated using the processor from the measured value (x) by way of a software application including a neural network (NN) with dynamic restrictions which outputs the output value (y) within the set value range (C(s)) for the determined parameter (s).

11 Claims, 4 Drawing Sheets

METHOD AND SYSTEM FOR GENERATING SAFETY-CRITICAL OUTPUT VALUES OF AN ENTITY

CROSS-REFERENCE TO RELATED APPLICATION

This application claims priority to German Patent Application No. 10 2019 119 739.2, filed Jul. 22, 2019, the content of such application being incorporated by reference herein in its entirety.

FIELD OF THE INVENTION

The invention relates to a method and system for generating safety-critical output values of an entity such as a motor vehicle.

BACKGROUND OF THE INVENTION

There is an increasing trend toward automation systems in motor vehicles, mobile devices and machines in all the sectors of industrial production and other sectors such as banking, commerce, hospitality and medical health systems. Here, data preparation and data analysis (data mining, deep learning, artificial intelligence) represents a central aspect.

By way of example, the goal of automated safety monitoring in a technical unit such as a motor vehicle is to assess the nature of individual components, right up to the entire unit, in order to avoid damage, plan maintenance and hence reduce costs. To this end, it may be expedient to define indices and characteristics for measured values, which must be observed and the overshoot or undershoot of which may be linked to a fault alarm. The measured values can be optical or acoustic data, such as damaging frequencies in the operating state of a component or drivetrain or optical data within the scope of facial recognition or automated distance monitoring in a motor vehicle or the calculation of permitted trajectories. Calculation algorithms are defined and configured for the obtained measured data, for example to obtain information about excitation and/or damage frequencies or information about a person or surroundings therefrom. These key factors such as key performance indices can then be monitored in order to provide timely identification of possible damage arising in the technical unit and the individual components if changes occur. However, these various steps in an analysis chain and/or calculation chain require a very high degree of expert know-how and, moreover, are complex and time-consuming from a mathematical point of view. Should an alarm be reported following successful commissioning of such safety monitoring, an expert has to be consulted in order to identify the detected fault of a component and/or installation, since automated fault identification previously often only supplied unacceptable results.

DE 101 13 538 B4, which is incorporated by reference herein, describes a closed-loop control apparatus. This closed-loop control apparatus comprises a loop controller, which receives an input variable and determines a manipulated variable therefrom, the latter being fed to an actuator of a controlled system. A neural correction encoder is provided, which receives a process variable from the controlled system, some of the loop controller input variables and some of the manipulated variables determined by the loop controller and which generates a correction signal from these input variables. Moreover, the correction encoder is adapted in real time by means of an online learning algorithm.

DE 10 2019 105850 A1, which is incorporated by reference herein, describes a method for generating a reduced neural network for a controller of a vehicle and/or of a vehicle component. A first data field of a first neural network is read. The first data field has entries which, in the totality thereof, partly represent an internal logic of the first neural network. The reduced neural network is generated with the aid of the first data field, wherein the reduced neural network has a reduced data field with entries which, in the totality thereof, at least partly represent an internal logic of the reduced neural network, the reduced data field containing fewer non-zero entries than the first data field.

DE 10 2019 105848 A1, which is incorporated by reference herein, relates to a method for generating a reduced neural network for a controller of a vehicle. Initially, the reduced neural network is initialized. Then, respective first corresponding output data records are calculated with the aid of a first neural network and on the basis of a respective input data record, wherein a totality of the respective input data records forms a first set of the input data records. Now, respective deviations of the first output data records from respective comparison data records are determined, with the respective first output data record corresponding to the respective comparison data record. Finally, the reduced neural network is adapted.

EP 1449743 B1, which is incorporated by reference herein, describes a recurrent neural network. The neural network is formed by linking a plurality of nodes and determines a parameter that displays a movement state of a vehicle on the basis of predetermined input information.

US 2018 0300629 A1, which is incorporated by reference herein, describes a method for training a neural network. The neural network comprises at least one layer having a plurality of input nodes, a plurality of output nodes and a plurality of connections, with each of the plurality of input nodes being connected to each of the plurality of output nodes. The method comprises the pseudo-random selection of a subset of the multiplicity of connections, with a weighting parameter being assigned to each connection.

SUMMARY OF THE INVENTION

Therefore, described herein is a method and a system for generating one or more safety-critical output values of an entity, which is distinguished by high reliability and, in the process, is less complex and time-consuming.

According to a first aspect, the invention relates to a method for generating one or more safety-critical output values y of an entity, wherein at least one parameter s of the entity is determined, said parameter describing at least one state and/or at least one feature of the entity; at least one delimited value range $C(s)$ for the parameter s is set; at least one measured value x for the determined parameter s is ascertained by at least one sensor; the measured value x is transmitted from the sensor to at least one processor and/or at least one data storage unit; and at least one output value y is calculated from the measured value x using the processor by means of a software application, the software application comprising a neural network with dynamic restrictions which outputs the output value y within the set value range $C(s)$ for the determined parameter s.

Advantageously, a known architecture of neural networks is used for the neural network with dynamic restrictions and is modified by a function φ such that the output value y of the neural network is located within the set value range C(s).

In a further embodiment, provision is made for a representation g(s) formed from the parameter s to be passed to the neural network as a further input value such that an output value y of the neural network also depends on the determined parameter s.

In an advantageous development of the method according to aspects of the invention, provision is made, in the case of a multidimensional neural network, for any N-dimensional convex polytope with M vertices $\{v^i\}_{i=1,\ldots,M}$ to be used for delimiting the value range and for the parameters s to be specified as the coordinates of the M N-dimensional vertices of the polytope with $s=(v^1_1, \ldots, v^1_N, v^2_1, \ldots, v^2_N, \ldots, v^M_1, \ldots, v^M_N)$, for the calculation values z to be defined in a final layer of the neural network as $z=(z_1, \ldots, z_M)$, for the function φ to be defined as $$\phi(z, s) = \sum_{i=1}^{M} \sigma_i(z)v^i$$

or $$\phi_j(z, s) = \sum_{i=1}^{M} \sigma_i(z)v^i_j$$

and applied to the calculation values $z=(z_1, \ldots, z_M)$ and the parameter $s=(v^1_1, \ldots, v^1_N, v^2_1, \ldots, v^2_N, \ldots, v^M_1, \ldots, v^M_N)$, where σ denotes an M-dimensional softmax function (normalized exponential function), as a result of which the following formula arises for the value range C(s) of the output values y:

$$C(s) = \left\{ y = \sum_{i=1}^{M} p_i v^i \in \mathbb{R}^N \,\middle|\, \sum_{i=1}^{M} p_i = 1, p_i > 0 \right\}$$

Advantageously, use is made of a database in which data in respect of the properties, the parameters, graphical images and target variables of the technical unit and the connections thereof are stored.

Here, the softmax function σ transforms the M-dimensional vector z with real components into an M-dimensional vector σ(z) with likewise real components in the value range (0, 1), with the components of the vector σ(z) overall being summed to 1.

In one embodiment, provision is made for the sensors to capture physical and/or chemical and/or biological measured variables.

According to a second aspect, the invention relates to a system for generating one or more safety-critical output values y of an entity, wherein the system is embodied to determine parameters s of the entity, which describe a state and/or at least one feature of the entity, and to set a delimited value range C(s) for the parameter s; wherein sensors are provided for ascertaining at least one measured value x for the determined parameter s and for transmitting the measured value x to a processor and/or a data storage unit; and wherein the processor is embodied to calculate an output value y by means of a software application, the software application containing a neural network with dynamic restrictions, which outputs the output value y within a set value range C(s) for the determined parameter s.

In a further embodiment, the neural network with dynamic restrictions uses a known architecture of neural networks and modifies the latter by a function φ such that the output value y of the neural network is located within the set value range C(s).

Advantageously, the neural network uses a representation g(s) formed from the parameter s as a further input value such that a calculation value z of the neural network also depends on the determined parameter s.

In an advantageous development, provision is made, in the case of a multidimensional neural network, for any N-dimensional convex polytope C(s) with M vertices $\{v^i\}_{i=1,\ldots,M}$ to be used for delimiting the value range C(s) and for the parameters s to be specified as the coordinates of the M N-dimensional vertices of the polytope with $s=(v^1_1, \ldots, v^1_N, v^2_1, \ldots, v^1_N, \ldots, v^M_N)$, for the calculation values z to be defined in a final layer of the neural network as $z=(z_1, \ldots, z_M)$, for the function φ to be defined as $$\phi(z, s) = \sum_{i=1}^{M} \sigma_i(z)v^i$$

or $$\phi_j(z, s) = \sum_{i=1}^{M} \sigma_i(z)v^i_j$$

and applied to the calculation values $z=(z_1, \ldots, z_M)$ and the parameter $s=(v^1_1, \ldots, v^1_N, v^2_1, \ldots, v^1_N, \ldots, v^M_N)$, where σ denotes an M-dimensional softmax function, as a result of which the following formula arises for the value range C(s) of the output values y:

$$C(s) = \left\{ y = \sum_{i=1}^{M} p_i v^i \in \mathbb{R}^N \,\middle|\, \sum_{i=1}^{M} p_i = 1, p_i > 0 \right\}$$

Advantageously, the sensors capture physical and/or chemical and/or biological measured variables.

According to a third aspect, the invention relates to a neural network for calculating output values y from input values and/or measured values x. The neural network is embodied to dynamically restrict the output values y to a set value range C(s), wherein use is made of a known architecture of neural networks and the latter is modified by a function φ such that the output value y of the neural network is located within the set value range C(s).

In an advantageous development, provision is made for a representation g(s) formed from the parameter s to be passed to the neural network as a further input value such that a calculation value z of the neural network also depends on the parameter s.

In a further embodiment, provision is made, in the case of a multidimensional neural network, for any N-dimensional convex polytope with M vertices $\{v^i\}_{i=1,\ldots,M}$ to be used for delimiting the value range C(s) and for the parameters s to be specified as the coordinates of the M N-dimensional vertices of the polytope with $s=(v^1_1, \ldots, v^1_N, v^2_1, \ldots, v^1_N, \ldots, v^M_N)$, for the calculation values z to be defined in a final layer of the neural network as $z=(z_1, \ldots, z_M)$, for the function φ to be defined as $$\phi(z, s) = \sum_{i=1}^{M} \sigma_i(z) v^i$$

or $$\phi_j(z, s) = \sum_{i=1}^{M} \sigma_i(z) v_j^i$$

and applied to the calculation values $z=(z_1, \ldots, z_M)$ and the parameter $s=(v^1_1, \ldots, v^1_N, v^2_1, \ldots, v^1_N, \ldots, v^M_N)$, where $\sigma$ denotes an M-dimensional softmax function, as a result of which the following formula arises for the value range $C(s)$ of the output values y:

$$C(s) = \left\{ y = \sum_{i=1}^{M} p_i v^i \in \mathbb{R}^N \,\middle|\, \sum_{i=1}^{M} p_i = 1,\ p_i > 0 \right\}$$

According to a fourth aspect, the invention relates to a computer program product, comprising an executable program code which is configured such that, upon its execution, it carries out the method according to the first aspect and/or the neural network according to the third aspect.

BRIEF DESCRIPTION OF THE DRAWING FIGURES

Below, the invention is explained in more detail on the basis of an exemplary embodiment illustrated in the drawing.

Additional features, aspects and advantages of the invention or its exemplary embodiments become evident from the detailed description in conjunction with the claims.

DETAILED DESCRIPTION OF THE INVENTION

Figure 1:
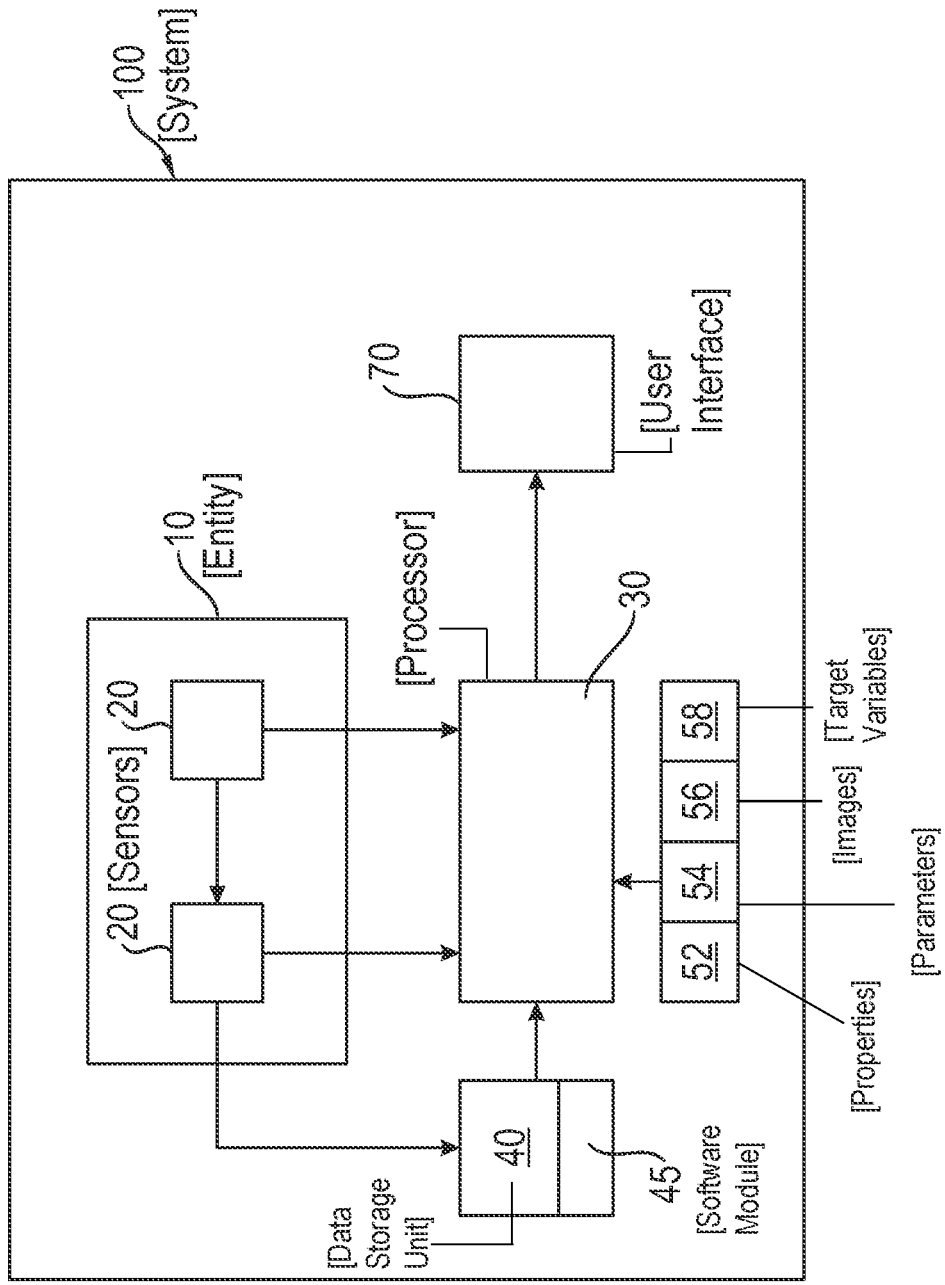
FIG. 1 shows a schematic illustration of a system according to aspects of the invention for generating safety-critical output values of an entity.

FIG. 1 shows a system 100 for generating safety-critical output values of an entity 10. By way of example, the entity 10 could be a motor vehicle which consists of various components. However, it could also be, for example, a complex industrial installation or an entity such as a camera, or else scientific instruments. The entity 10 is provided with sensors 20 that record acoustic, optical, chemical and/or any other measured values x as data. By way of example, the sensors 20 could be pressure sensors, piezo-sensors, rotational speed sensors, temperature sensors and/or image-recording sensors such as cameras. The sensors 20 transmit the measured values x to a processor 30, which processes the data by means of a software application using an algorithm. According to aspects of the invention, the algorithm has a neural network. However, it is also conceivable for the data to initially be stored in a data storage unit 40 or a software module 45 and only be processed by the processor 30 at a later time.

In the context of the invention, a "processor" can be understood to mean a machine or an electronic circuit, for example. In particular, a processor can be a central processing unit (CPU), a microprocessor or microcontroller, for example an application-specific integrated circuit or digital signal processor, possibly in combination with a data storage unit for storing program commands, etc. Additionally, a processor can be understood to be a virtual processor, a virtual machine or soft CPU. By way of example, this could also be a programmable processor which is equipped with configuration steps for carrying out the specified method according to aspects of the invention or which is configured by configuration steps in such a way that the programmable processor realizes the features of the method, of the component, of the modules according to aspects of the invention or other aspects and/or partial aspects of the invention.

In the context of the invention, a "data storage unit" or "data storage module" and the like can be understood to mean, for example, a volatile data storage in the form of random access memory (RAM) or a permanent data storage such as a hard disk drive or a data medium or, e.g., a replaceable data storage module. However, the data storage module could also be a cloud-based storage solution.

In the context of the invention, a "module" can be understood to mean, for example, a processor and/or a data storage unit for storing program commands. By way of example, the processor is specifically configured to carry out the program commands in such a way that the processor carries out functions to implement or realize the method according to aspects of the invention or a step of the method according to aspects of the invention.

In the context of the invention, "measured values" should be understood to mean both the raw data and already prepared data from the measurement results of the sensors 20.

Furthermore, provision can be made for the processor 30 to access a database 50, in which properties 52 and parameters 54 of the entire entity 10 and its components are stored. By way of example, the parameters 54 could include rotational speed frequencies and damage frequencies in a motor, or else the torque of the motor at a certain speed. Consequently, interactions between various parameters 54 of an entity 10 are representable. In the case of complex entities 10, such as a motor, for example, it is consequently possible to capture the individual components with their possible excitation frequencies. Moreover, graphical images 56, for example from the surroundings of the entity 10, can be downloaded from the database 50. However, it is also conceivable for construction plans of the entity 10, such as of a bearing of a transmission or of the motor, to be stored in the database 50. Moreover, target variables and target values 58, which define a safety standard, could be stored in the database 50.

Consequently, the database 50 stores information or data for each entity 10 in respect of the properties 52 thereof, the parameters 54 thereof, graphical images 56 and target variables 58 and how these properties 52 and parameters 54 are connected to one another.

Moreover, provision can be made of a user interface 70, which may be embodied as a display, for outputting the calculation results and/or a warning message.

According to the present invention, the processor 30 uses a modified architecture of an artificial neural network (NN)

with the property of being able to restrict, in a targeted manner, the output value range in relation to an input value within the scope of each forward calculation step when processing the measured data. The input values are preferably the data of the measured values x from the sensors 20. One possible application provides for the assumption that previously defined safety criteria are satisfied only to be able to be made if the calculation of the input values by the processor 30 yields that the calculation result for the input values lies within the previously set output value range. By way of example, a warning message is output if a restriction to the previously defined output value range is not possible.

According to the present invention, a known neural network (NN) with a maximum output set D is restricted to a certain output value range C(s) by way of additional parameters s for a data point, which may be embodied as measured value x, being introduced into the neural network (NN). Consequently, these parameters s can be considered to be additional input values. These parameters s are defined as a subset C(s) of the maximum output set D of the neural network. Arbitrary further parameters that preferably represent the learnable parameters of the neural network are denoted by θ. The output values y are defined as:

$$y = f_\theta(x, s) \in C(s) \subseteq D$$

where $$\forall x \in X \, \forall s \in S \, \forall \theta \in W$$

Setting the architecture of the neural network according to aspects of the invention in this way determines that the target values $y = f_\theta(x, s)$ of the neural network are only located within the output set C(s). Within the scope of the present invention, neural networks with this architecture are referred to as neural networks with dynamic restrictions. The known architecture of neural networks is used and modified by the function φ in such a way that the output value y is located within a defined output value range C(s). Since the present invention relates to a development of the known architecture of neural networks, it is possible to apply training algorithms of known neural networks. In particular, this applies to gradient-based optimization methods and classifying methods, which can be used for the neural networks according to aspects of the invention with dynamic restrictions. The use of known training algorithms for the neural network according to aspects of the invention is advantageous in that additional safety properties can be added.

The present invention creates a neural network with dynamic restrictions by virtue of modifying neural networks with a known architecture in a specific fashion. The neural network according to aspects of the invention maps each output value y within a defined value range C(s), which was set for a specific parameter s. Unexpected output values, as usually occur in known neural networks, can therefore be avoided. By contrast, the neural network according to aspects of the invention supplies output values located within the value range C(s) and is therefore drawn up deterministically in terms of its structure. Once again, the value range C(s) can be set or determined on the basis of specific calculation processes or algorithms. By way of example, in the field of autonomous driving, the value range C(s) can thus represent a solution space in which a certain movement of a vehicle can occur along a trajectory without the possibility of a collision with other vehicles.

Moreover, the calculation outlay can be reduced by the modified architecture of the neural network according to aspects of the invention. Moreover, it is possible to use very deep neural networks, which are distinguished by a high accuracy of the calculation results. This is important, in particular, in the case of safety-critical applications, which are distinguished by low error tolerances. Moreover, different categories of restrictions, which relate to the respective application, can be set according to aspects of the invention.

Figure 2:
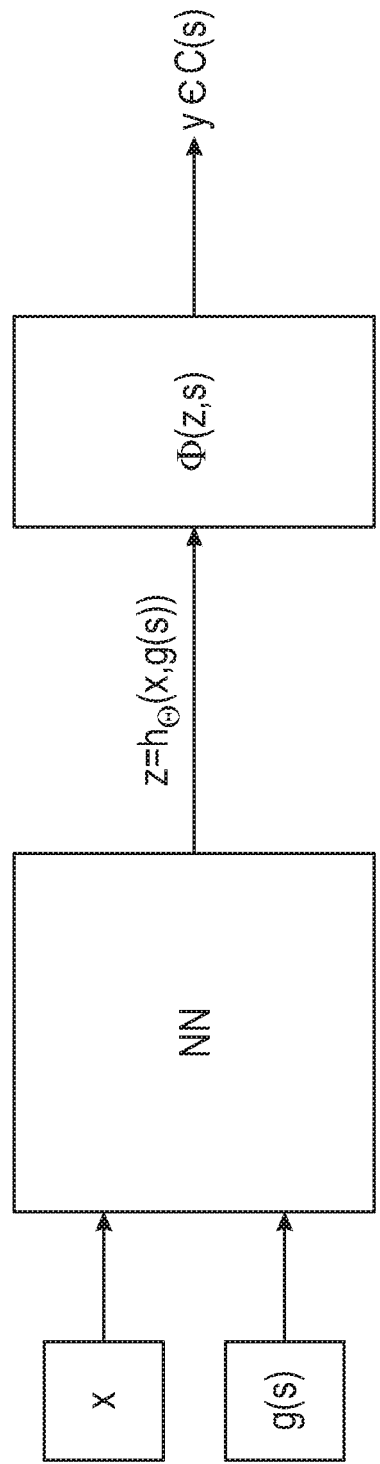
FIG. 2 shows a schematic illustration of a neural network according to aspects of the invention.

FIG. 2 illustrates the modeling of a neural network with dynamic restrictions according to aspects of the invention. A neural network $h_\theta$ with a known architecture consisting of various layers is combined with an extending function φ in order to control the restriction to the output value range C(s). The function φ maps the calculation value z of the neural network onto the value range C(s), which depends on the parameter s. It contains no learnable parameters θ itself.

In a development of the invention, the calculation value z of the neural network can also depend on the parameter s itself if representations g(s) formed from the parameter s are passed to the neural network as further input values. The function φ(z,s) is then applied to the calculation value $z = h_\theta(x, g(s))$ of the neural network and it maps the output value y of the neural network onto the value range C(s), wherein the parameter s is used to specify the restriction of the maximum value set D to the corresponding subset consisting of the output range C(s). Should the function φ moreover be differentiable in z, gradient-based optimization methods can be applied to this neural network according to aspects of the invention.

Consequently, the following applies:

$$\forall s \in S \, \forall Z \in Z: \varphi(z, s) \in C(s)$$

$$\Rightarrow \forall x \in X \, \forall s \in S \, \forall \theta \in W: y = \varphi(h_\theta(x, g(s)), s)$$
$$\stackrel{\text{def}}{=} f_\theta(x, s) \in C(s)$$

Since neural networks usually have a multidimensional embodiment, the modeling of a neural network with dynamic restrictions according to aspects of the invention is described below in relation to the restriction of the output value range to any N-dimensional convex polytope C(s) with M vertices $\{v^i\}_{i=1, \ldots, M}$. The polytope C(s) is specified as a restrictive parameter by the coordinates of the M N-dimensional vertices $s = (v^1_1, \ldots, v^1_N, v^2_1, \ldots, v^M_N, \ldots, v^M_N)$. The calculation values z in the final layer of the neural network are defined as $z = (z_1, \ldots, z_M)$. Now, the function φ is defined as follows:

$$\phi(z, s) = \sum_{i=1}^{M} \sigma_i(z) v^i$$

or $$\phi_j(z, s) = \sum_{i=1}^{M} \sigma_i(z) v^i_j$$

and is applied to the calculation values $z = (z_1, \ldots, z_M)$ and the parameter $s = (v^1_1, \ldots, v^1_N, v^2_1, \ldots, v^1_N, \ldots, v^M_N)$, where σ denotes an M-dimensional softmax function. Here, the softmax function σ transforms the M-dimensional vector z with real components into an M-dimensional vector σ(z) with likewise real components in the value range (0, 1), with the components of the vector σ(z) overall being summed to 1.

As a result, the following formula arises for the value range C(s) of the output values (y):

$$C(s) = \left\{ y = \sum_{i=1}^{M} p_i v^i \in \mathbb{R}^N \;\middle|\; \sum_{i=1}^{M} p_i = 1, \, p_i > 0 \right\}$$

Consequently, if the vectors s of the convex polytope C(s) are passed to the neural network as representations g(s), the result is located, in turn, in the considered convex polytope C(s).

The scope of the invention allows for further generalizations for restricting various components $Z_k$ of a multidimensional output of a neural network to k different convex polytopes $C_k$, each with different dimensions and number of vertices. For the various calculation values $Z_1, \ldots, Z_k$, different functions $\varphi_1, \ldots, \varphi_k$ are chosen for mapping the components $Z_1, \ldots, Z_k$ on the output values $Y_1, \ldots, Y_k$. The convex polytopes $C_k$ can be represented by combining the coordinates of the vertices of all polytopes.

In principle, it is also conceivable to restrict the output values y of a neural network to a non-convex polytope by virtue of the non-convex polytope being divided into convex polytopes. Then, the method according to aspects of the invention can be performed in the convex polytope components. Additionally, softmax probabilities are used to select the polytope component that represents the solution to a problem.

Such a multidimensional neural network with dynamic restrictions also renders it possible to connect a plurality of entities and technical units with one another. By way of example, it is possible to undertake comparisons between various vehicles of a certain vehicle type. By way of example, the data from various vehicles can be transmitted during their operation to a cloud in order to ascertain data analysis on the basis of mean values of technical data, for example in relation to the behavior of the transmission after a defined mileage, by means of the algorithm of the present invention.

Consequently, a neural network with dynamic restrictions is suitable for various technical applications. The algorithm of the neural network is preferably carried out on a processor 30 with a data storage unit 40. It receives measured values x or already partly processed measured values from sensors 20 as input values, which are processed into output values y by means of the neural network according to aspects of the invention. According to the present invention, a specific architecture is provided for the employed neural network, said architecture precluding an output value y of the neural network from being located outside of a defined output value range C(s). The output value range C(s) of the neural network can differ for different input data and is specified by the parameter s.

The invention is usable for a multiplicity of applications, such as the movement planning in the case of an autonomously driving vehicle. Here, the input data can be measured values x from sensors in the vehicle, such as a camera, for example, or use can be made of lidar, radar or ultrasound. It is also possible to use already processed measured values such as object data. By way of example, the output values could illustrate a trajectory that represents the spatial and temporal movement of an entity 10 such as a vehicle, or could contain direct manipulated variables, for example for the closed-loop control of steering in the vehicle.

Known neural networks that are used for the calculation of the movement planning of a vehicle are disadvantageous in that their behavior is only predictable with difficulties on account of their "black box character". Consequently, they are only conditionally usable for situations which have high demands in terms of safety placed thereon. Particularly for uses in the field of autonomous driving, the movement planning leading to collisions with other traffic users needs to be precluded. By contrast, the neural network according to aspects of the invention renders it possible to preclude certain behavior patterns, such as the choice of a trajectory leading to a collision, by restricting the output value range C(s). For movement planning, the algorithm according to aspects of the invention only allows trajectories that avoid a collision with other present and detected vehicles. Since the movement planning of a vehicle relates to a change in position of the vehicle in time and space, the output value range C(s) can be dynamically modified over time according to aspects of the invention. A movement of the vehicle is only allowed if the trajectory is located within a previously defined spatial region at a time t.

Further application examples of the present invention relate to closed-loop control of the x- and y-coordinates of a vehicle, for example a transverse control in the case of a lane assistant or a longitudinal control in the case of an adaptive cruise control (ACC). In this case, a target acceleration or a target steering angle is calculated as an output value, preferably on the basis of measured data such as, e.g., the distance to a vehicle ahead. A closed-loop control using the algorithm according to aspects of the invention can calculate lower and upper limits for the output values on the basis of measured values as the input values. Advantageously, the behavior of the neural network can be trained within these limits before it is used in a vehicle.

In the field of image processing, the restriction of the output region could represent an examination region (region of interest). Thus, there could be an automated localization of a specific structure, for example a certain anatomical feature of the eye for an eye operation, in a medical image recording.

Figure 3:
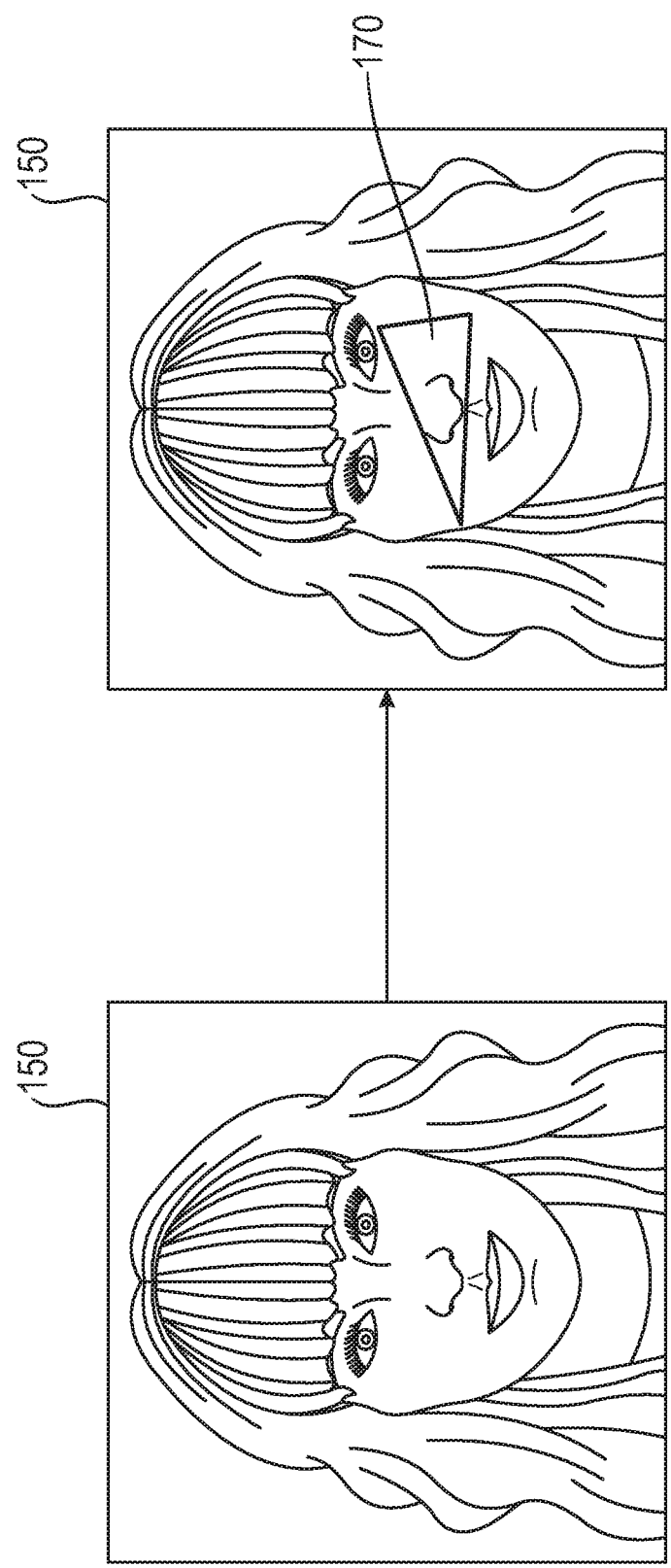
FIG. 3 shows a schematic illustration of image processing using a neural network according to aspects of the invention.
Figure 4:
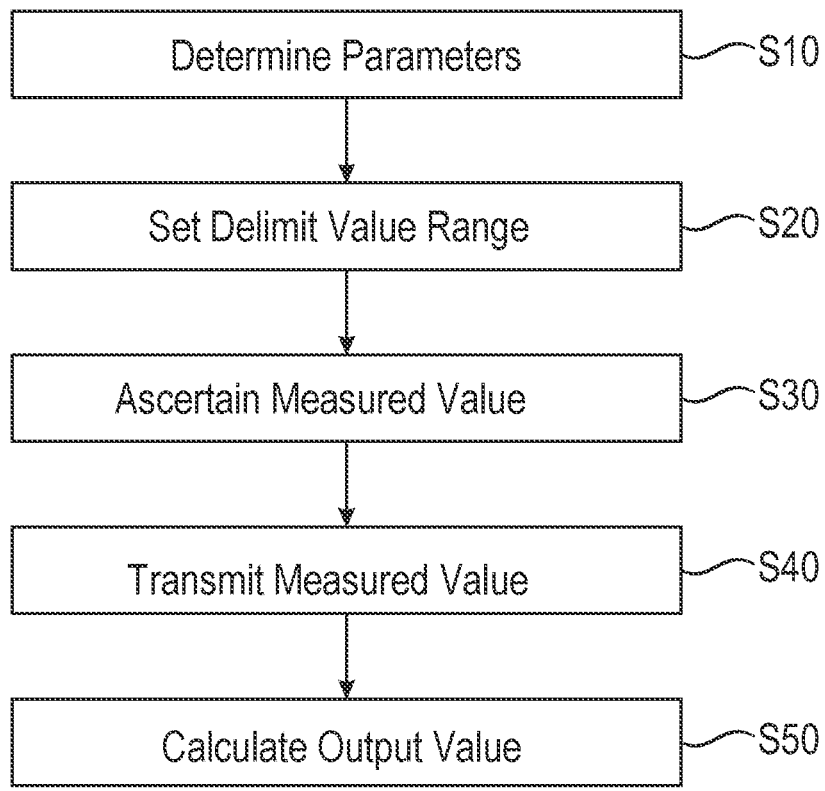
FIG. 4 shows a flowchart for explaining the individual method steps of a method according to aspects of the invention.
Figure 5:
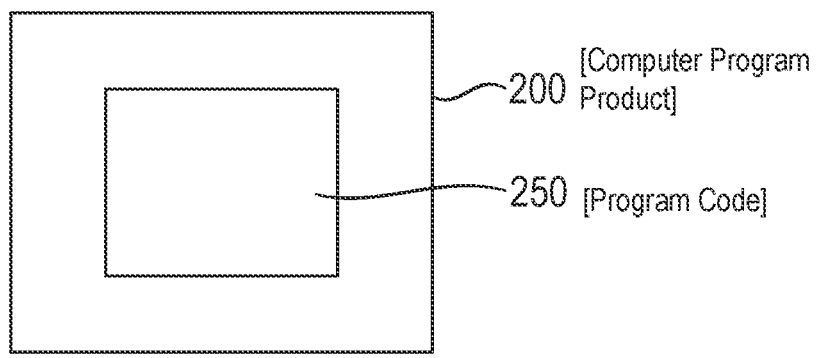
FIG. 5 shows a computer program product according to an embodiment of the fourth aspect of the invention.

In the field of automatic facial recognition, the neural network according to aspects of the invention can be used to define boundary regions (a bounding box) for faces. Should the position of features such as the eyes or the tip of the nose be determined for a detected face, the output value range can be restricted to within the bounding box by means of the present invention. FIG. 3 schematically illustrates the photo 150 of a person. The pixels of the photo 150 form the measured values $x_i$ and, according to the present invention, these are restricted to the region of the output values $y_i$, which is embodied as a triangle 170 which surrounds the tip of the nose in this example.

In one development of the invention, provision is made for the invention to be used for monitoring the safety of an entity 10. For example, parameters s which define normal operation of the entity 10 can be defined. Moreover, a neural network with dynamic restrictions facilitates the use of knowledge-based solutions and can therefore be used for problems in the field of knowledge management and research projects, for example in the development of medicaments. Using the neural network according to aspects of the invention, it is possible to easily and clearly distinguish allowed output value ranges from unwanted ranges, for example different patient groups in respect of the tolerance to a medicament.

The behavior of the neural network according to aspects of the invention is therefore not only trained implicitly in a manner known per se by means of data; instead, explicit modeling by determining the output value range is also possible. Here, the output value range C(s) can be interpreted as already available knowledge about the output values y, for example as a result of expert knowledge or known mathematical relationships.

A method for monitoring the state of a technical unit 10 according to the present invention therefore comprises the following steps:

Parameters s of an entity 10, which describe a state and/or feature of the entity 10, are determined or ascertained in a step S10. Here, this could be the excitation and/or damage frequencies in the case of a motor or a spatial region for a trajectory in the case of an autonomously driving vehicle.

A delimited value range C(s) for the parameter s is set in a step S20.

At least one measured value x for the determined parameter s is ascertained by at least one sensor 20 in a step S30.

The sensor transmits the measured value x to the processor 30 and/or to a data storage unit 40 in a step S40.

The processor 30 calculates at least one output value from the measured value x by means of a software application in a step S50, the software application comprising a neural network (NN) with dynamic restrictions which outputs the output value y within the set value range C(s) for the determined parameter.

According to the present invention, state monitoring of an entity such as a technical unit can be significantly simplified in terms of complexity and time expenditure. There can be reliable safety monitoring for an entity by means of the algorithm, according to aspects of the invention, of a neural network with dynamic restrictions. In the case of a fault, an automated assessment and guidance can be derived by evaluating all available information from captured and calculated data and the correlation thereof.

Consequently, it is possible to create a complete safety monitoring project and the technical state of a technical unit 10, such as, e.g., a drivetrain or an individual component, can be monitored and automatically assessed in terms of its operating state. This allows guidance to be output in respect of how an identified fault situation can be handled.

LIST OF REFERENCE SIGNS

10 Entity
20 Sensor
30 Processor
40 Data storage unit
45 Software module
50 Database
52 Properties
54 Parameter
56 Graphical images
58 Target variables
70 User interface
100 System
150 Photo
170 Triangle
200 Computer program product
250 Program code

What is claimed:

1. A method for generating one or more safety-critical output values (y) of entity, said method comprising:
   a) determining at least one parameter (s) of the entity, said parameter describing at least one state and/or at least one feature of the entity;
   b) setting at least one delimited value range (C(s)) for the parameter (s);
   c) ascertaining at least one measured value (x) for the determined parameter (s) by at least one sensor;
   d) transmitting the measured value (x) from the sensor to at least one processor and/or at least one data storage unit; and
   e) calculating at least one output value (y) from the measured value (x) using the processor using a software application, the software application comprising a neural network (NN) with dynamic restrictions which outputs the output value (y) within the set value range C(s) for the determined parameter (s).

2. The method as claimed in claim 1, wherein the neural network (NN) with dynamic restrictions uses a known architecture of neural networks and is modified by a function ($\varphi$) such that the output value (y) of the neural network (NN) is located within the set value range (C(s)).

3. The method as claimed in claim 2, wherein a representation (g(s)) formed from the parameter (s) is passed to the neural network (NN) as a further input value such that a calculation value (z) of the neural network (NN) also depends on the parameter (s).

4. The method as claimed in claim 3, wherein, in the case of a multidimensional neural network (NN), any N-dimensional convex polytope with M vertices $\{v^i\}_{i=1,\ldots,M}$ is used for delimiting the value range (C(s)) and the parameters (s) are specified as coordinates of the M N-dimensional vertices of the polytope with $s=(v^1_1, \ldots, v^1_N, v^2_1, \ldots, v^2_N, \ldots, v^M_1, \ldots, v^M_N)$, the calculation values (z) are defined in a final layer of the neural network (NN) as $z=(z_1, \ldots, z_M)$, the function $\varphi$ is defined as either:

$$\phi(z,s) = \sum_{i=1}^{M} \sigma_i(z) v^i$$

or $$\phi_j(z,s) = \sum_{i=1}^{M} \sigma_i(z) v^i_j$$

and applied the calculation values $z=(z_1, \ldots, z_M)$ and the parameter $s=(v^1_1, \ldots, v^1_N, v^2_1, \ldots, v^2_N, \ldots, v^M_1, \ldots, v^M_N)$, where $\sigma$ denotes an M-dimensional softmax function, as a result of which the following formula arises for the value range (C(s)) of the output values (y):

$$C(s) = \{\gamma \gamma \Sigma_{i=1}^{M} p_i v^i \in \mathbb{R}^N | \Sigma_{i=1}^{M} p_i 1, p_i > 0\}.$$

5. The method as claimed in claim 1, further comprising using a database, in which database is stored data related to properties, parameters, graphical images and target variables of the technical unit and the connections thereof.

6. The method as claimed in claim 1, wherein the sensors capture physical and/or chemical and/or biological measured variables.

7. A system for generating one or more safety-critical output values (y) of an entity, wherein the system is configured to (i) determine parameters (s) of the entity, which describe a state and/or at least one feature of the entity, and (ii) set a delimited value range (C(s)) for the parameter (s), said system comprising:
   sensors configured for ascertaining at least one measured value (x) for the determined parameter (s) and for transmitting the measured value (x) to a processor and/or a data storage unit;
   wherein the processor is configured to calculate an output value (y) by a software application, the software application containing a neural network (NN) with dynamic restrictions, which outputs the output value (y) within a set value range (C(s)) for the determined parameter (s).

8. The system as claimed in claim 7, wherein a known architecture of neural networks is used for the neural network (NN) with dynamic restrictions and is modified by a function (φ) such that the output value (y) of the neural network is located within the set value range (C(s)).

9. The system as claimed in claim 8, wherein a representation (g(s)) formed from the parameter (s) is passed to the neural network (NN) as a further input value such that a calculation value (z) of the neural network (NN) also depends on the determined parameter (s).

10. The system as claimed in claim 9, wherein, in a case of a multidimensional neural network (NN), any N-dimensional convex polytope C(s) with M vertices $\{v^i\}_{i=1,\ldots,M}$ is used for delimiting the value range (C(s)) and the parameters (s) are specified as the coordinates of the M N-dimensional vertices of the polytope with $s=(v^1_1, \ldots, v^1_N, v^2_1, \ldots, v^2_N, \ldots, v^M_1, \ldots, v^M_N)$, the calculation values (z) are defined in a final layer f the neural network (NN) as $z=(z_1, \ldots, z_M)$, the function φ is defined as either $$\phi(z, s) = \sum_{i=1}^{M} \sigma_i(z) v^i$$

or $$\phi_j(z, s) = \sum_{i=1}^{M} \sigma_i(z) v^i_j$$

and applied to the calculation values $z=(z_1, \ldots, z_M)$ and the parameter $s=(v^1_1, \ldots, v^1_N, v^2_1, \ldots, v^2_N, \ldots, v^M_1, \ldots, v^M_N)$, where σ denotes an M-dimensional softmax function, as a result of which the following formula arises for the value range (C(s)) of the output values (y):

$$C(s)=\{y|\gamma\Sigma_{i=1}^{M} p_i v^i \in \mathbb{R}^N | \Sigma_{i=1}^{M} p_i 1, p_i > 0\}.$$

11. The system as claimed in claim 7, wherein the sensors capture physical and/or chemical and/or biological measured variables.

* * * * *